(12) United States Patent
Doornekamp et al.

(10) Patent No.: US 6,454,101 B1
(45) Date of Patent: Sep. 24, 2002

(54) ENDLESS CONVEYOR

(75) Inventors: Martin Doornekamp, Nijkerk (NL); Brand van den Hazel, Putten (NL)

(73) Assignee: FPS Food Processing Systems, B.V. (NL)

( * ) Notice: Subject to any disclaimer, the term of this patent is extended or adjusted under 35 U.S.C. 154(b) by 0 days.

(21) Appl. No.: 09/743,099

(22) PCT Filed: Jul. 5, 1999

(86) PCT No.: PCT/NL99/00419

§ 371 (c)(1),
(2), (4) Date: Mar. 16, 2001

(87) PCT Pub. No.: WO00/01229

PCT Pub. Date: Jan. 13, 2000

(30) Foreign Application Priority Data

Jul. 6, 1998 (NL) .............................................. 1009569

(51) Int. Cl.[7] .................. B07B 13/05; B07B 13/07; B07B 13/075; B07C 5/12; B65G 17/00
(52) U.S. Cl. .................. 209/668; 209/667; 198/779; 198/792; 198/803.14
(58) Field of Search ................. 198/387, 779, 198/792, 803.14; 209/510, 667, 668, 669, 673, 912, 919

(56) References Cited

U.S. PATENT DOCUMENTS

| | | | | |
|---|---|---|---|---|
| 2,417,921 A | * | 3/1947 | Fox | 209/667 |
| 4,195,736 A | * | 4/1980 | Loeffler | 177/188 |
| 4,732,257 A | * | 3/1988 | Mathis et al. | 104/25 |
| 4,872,564 A | * | 10/1989 | van der Schoot | 198/387 |
| 4,979,624 A | * | 12/1990 | Ellis | 209/662 |
| 5,030,001 A | * | 7/1991 | vande Vis | 209/510 |
| 5,181,596 A | * | 1/1993 | Warkentin | 198/370.05 |

* cited by examiner

*Primary Examiner*—Christopher P. Ellis
*Assistant Examiner*—Gene O. Crawford
(74) *Attorney, Agent, or Firm*—Larson & Taylor, PLC

(57) ABSTRACT

An endless conveyor for conveying substantially rotationally-symmetrical products, comprising at least one endless conveying element and a number of transverse elements extending substantially perpendicularly to a conveying direction. At least one hourglass-shaped roller is mounted on each transverse element. The mutual distance between the successive transverse elements in a first path part is smaller than in a second path part. A first control device is provided for effecting an increase of distance between the transverse elements at a first transition from the first to the second path part. A second control device is provided for effecting a decrease of distance between the transverse elements at a second transition from the second to the first path part. A rotationally-symmetrical support element is movable, in a portion of the second path, between each pair of successive hourglass-shaped rollers for supporting the products to be conveyed.

14 Claims, 13 Drawing Sheets

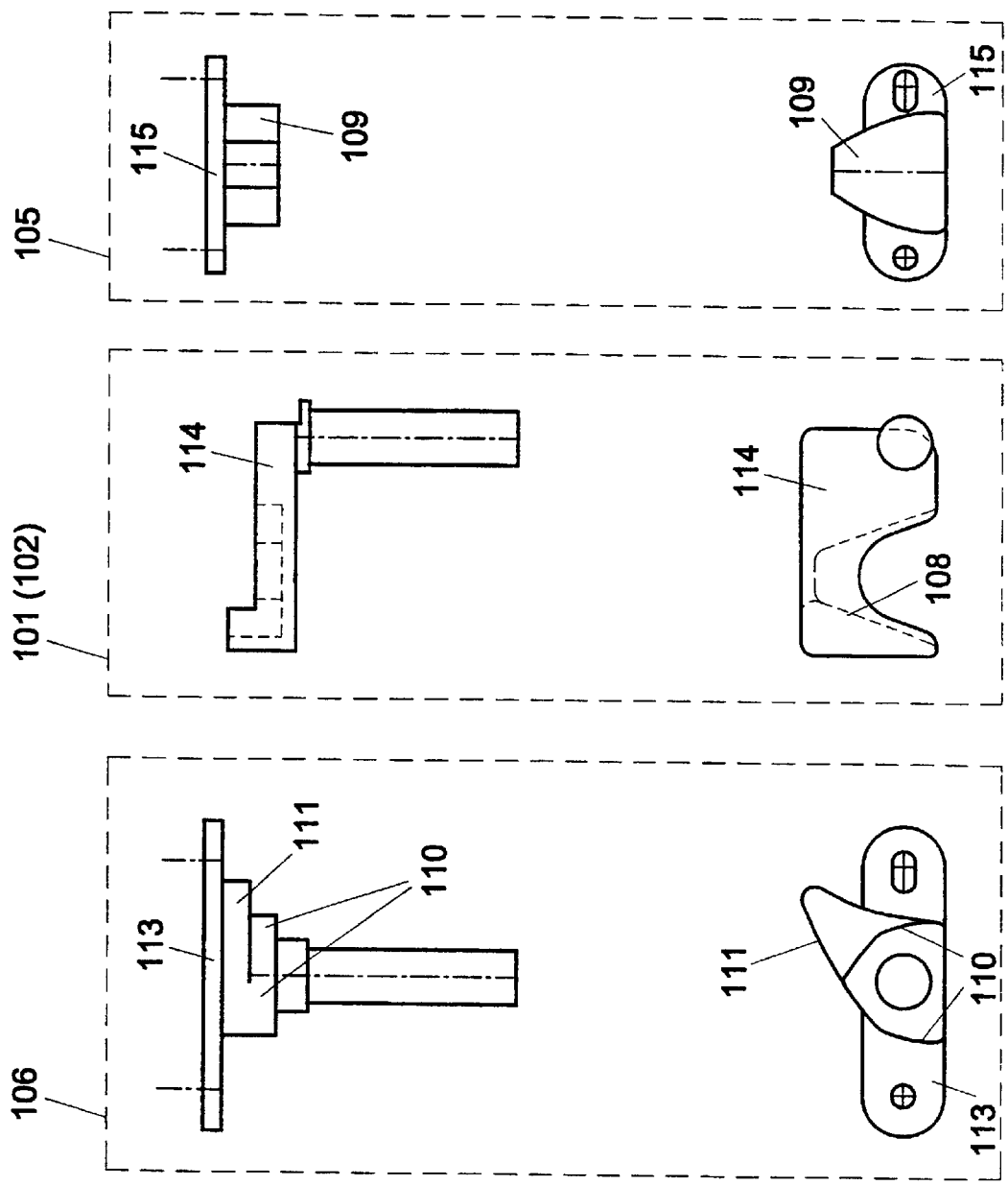

ENDLESS CONVEYOR

FIELD OF THE INVENTION

The invention relates to an endless conveyor for conveying substantially rotationally-symmetrical products, comprising at least one endless conveying element and a number of transverse elements extending substantially perpendicularly to a conveying direction, wherein the endless conveyor comprises a drive mechanism, wherein at least one hourglass-shaped roller is mounted on each transverse element, such that the hourglass-shaped rollers mounted on the transverse elements located one behind the other extend in one or more rows, said rows extending in the conveying direction.

BACKGROUND OF THE INVENTION

A prior conveyor apparatus is for instance known from U.S. Pat. No. 4,872,564 and is denoted therein by reference numeral 1. In practice, such a conveyor is referred to by the term "roller conveyor". The products are nested in the space bounded by two successive rollers of the conveyor. Hence, each roller of the conveyor bounds two nesting spaces. Sometimes, the rollers of the roller conveyor are driven for rotation thereof, causing a product resting on the rollers to rotate as well. This is for instance the case when the product resting on the rollers is to be inspected. In this manner, for instance eggs can be candled and/or checked for breakage in an automatic fashion. Because in general, two products rest on each roller, there is the chance that if one of the products has been fouled, the dirt is transferred from one product onto the other product via the rotating roller. This phenomenon, in practice referred to by the term "smearing", has a consequence that the rollers of the endless conveyor rapidly become foul and that the products located on the conveyor rapidly foul each other. This is highly undesirable. U.S. Pat. No. 2,296,645 discloses a roller conveyor having double rollers. Because in this conveyor, only one product rests on each roller, the problem of smearing is solved. A drawback of this known apparatus, however, is that the diameter of the rollers relative to the products to be conveyed should be relatively small. Indeed, when a larger diameter is selected for the rollers, the center-to-center distance between the successive nesting spaces is particularly large. Such large center-to-center distance is undesirable, since the products are generally supplied in close succession and, accordingly, have to be moved apart in order to be conveyed further via the endless conveyor. Since no special facilities have been arranged for moving the products apart, the products will have to undergo a sudden change of velocity, due to the sudden change of distance relative to each other. After all, if the same amount of products have to be fed through per unit of time, while the products have to be located at a larger distance from each other, this can only be effected by increasing the velocity of the products. The sudden increase of velocity of the products is particularly undesirable, in particular in the case of fragile products, such as for instance eggs. The products may break easily, which leads to fouling of the conveyor and the loss of products.

Another drawback of the conveyor of U.S. Pat. No. 2,296,645 is that the length of the shafts on which the rollers are mounted is limited, as the diameter of these shafts can only be very slight because of the slight diameter of the rollers. The shafts will deflect under the influence of the weight of the products resting thereon, which considerably impedes the operation of the conveyor, in particular in the case of rotating rollers.

SUMMARY OF THE INVENTION

An object of the invention is to provide an endless conveyor wherein no smearing occurs and wherein, moreover, no sudden increase of velocity of the products fed thereon occurs.

To this end, according to the invention, the endless conveyor is provided for conveying substantially rotationally-symmetrical products and characterized in that the mutual distance between the successive transverse elements in a first path part is smaller than in a second path part, wherein a first control device is provided effecting an increase of distance between the transverse elements at a first transition from the first to the second path part, wherein a second control device is provided effecting a decrease of distance between the transverse elements at a second transition from the second to the first path part, wherein in at least a portion of the second path part, which portion, viewed in conveying direction, extends from the first transition, a support element has moved between each pair of successive hourglass-shaped rollers for supporting the products to be conveyed.

Such an endless conveyor offers the advantage that the products in the first path part are slightly spaced apart in that, at that location, the mutual distance between the successive transverse elements is less than in the second path part. The products lying against each other that are fed to the endless conveyor are received on the first path part of the endless conveyor. In this first path part, the products are supported by two successive hourglass-shaped rollers. Subsequently, at the first transition, the distance between the hourglass-shaped rollers is increased by means of the second control device. At the same time, a support element is moved between each pair of successive hourglass-shaped rollers, for supporting the products to be conveyed. Hence, after the first transition, the products to be conveyed rest on an hourglass-shaped roller and a support element.

Due to this construction, products are prevented from undergoing a sudden increase of velocity for increasing the mutual distance thereof. After all, the increase of the distance takes place in a controlled manner due to the presence of the control device. The products are already conveyed in a controlled manner in the first path part and at the first transition, the mutual distance between the products is increased in a controlled manner. Hence, the chance of breakage resulting from substantial, suddenly occurring variations of velocity has been minimized, since these variations of velocity do not occur. It is observed that by the term 'hourglass-shaped roller', any nest-forming element is meant.

To moreover prevent the occurrence of smearing, according to a further elaboration of the invention, the endless conveyor is characterized in that in at least a part of said portion of the second path part, either the hourglass-shaped rollers or the support elements that have moved between the hourglass-shaped rollers are rotatably drivable, while in the first path part, the hourglass-shaped rollers do not rotate.

As a result, no smearing occurs in the first path part, where each hourglass-shaped roller supports two products, because the hourglass-shaped rollers do not rotate there. The hourglass-shaped rollers rotate in the second path part only. However, because in the second path part, each hourglass-shaped roller is in contact with only one product, no smearing can occur between the products relative to each other. Preferably, the distance between the hourglass-shaped rollers in the first path part is so small that the smallest ones of a specific type of product keeps resting on two successive hourglass-shaped rollers, while the distance between the hourglass-shaped rollers in the second path part is so large that the largest ones of said specific type of product can move through two successive hourglass-shaped rollers.

BRIEF DESCRIPTION OF THE DRAWINGS

Elaborations are described in the subclaims and will hereinafter be specified on the basis of an exemplary embodiment, with reference to the accompanying drawings. In these drawings:

FIG. 15 is a side and top plan view, respectively, of a link of the endless conveyor 1301;

FIG. 16 is a side and top plan view, respectively, of a link of the first control chain; and FIG. 17 is a link in side and top plan view of a second control chain of the endless conveyor according to the third exemplary embodiment.

DETAILED DESCRIPTION OF THE INVENTION

Figure 1:
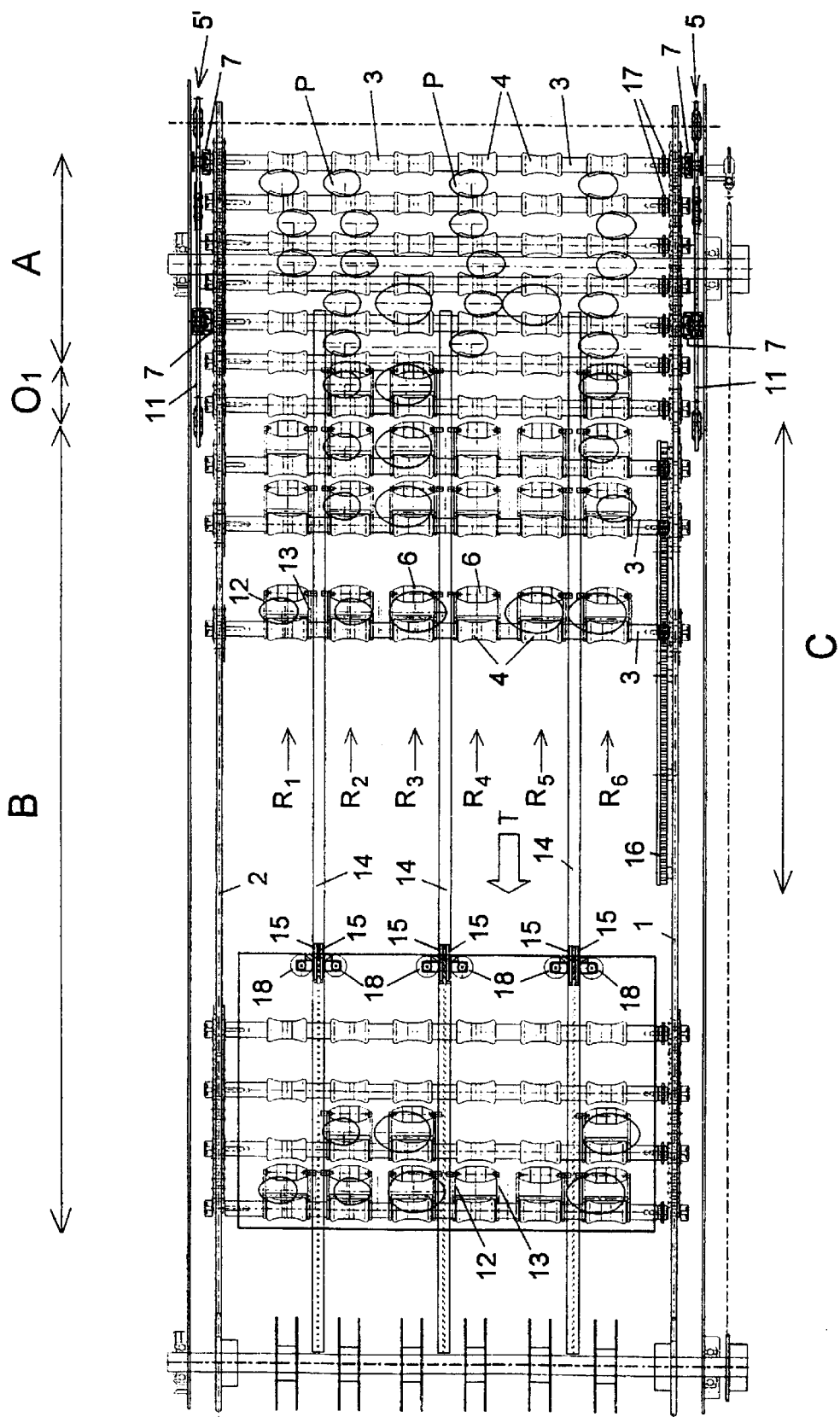
FIG. 1 is a schematic top plan view of an exemplary embodiment of an endless conveyor according to the invention.
Figure 2:
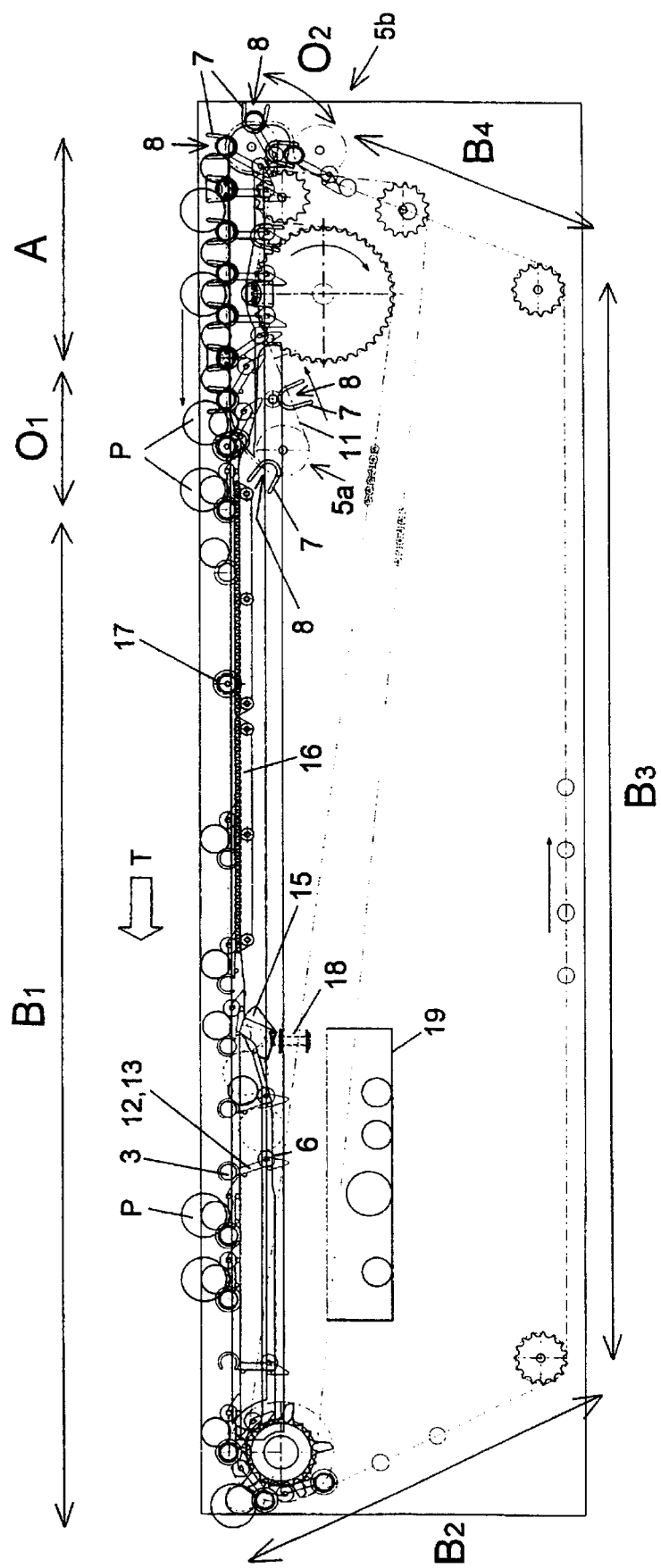
FIG. 2 is a schematic side elevation of the endless conveyor shown in FIG. 1.

The exemplary embodiment, shown in FIGS. 1 and 2, of an endless conveyor for conveying substantially rotationally-symmetrical products P is in particular intended for conveying eggs P. The endless conveyor shown can constitute the transition from a feed-in portion of a sorting and packaging apparatus for eggs P. Lying against one another, the eggs P are fed to the endless conveyor. A main function of the endless conveyor is to increase the mutual distance between the eggs P, with this increase of distance taking place in a gradual fashion. The endless conveyor comprises at least one endless conveying element 1, 2. In this exemplary embodiment, two endless conveying elements 1, 2 are provided. There are further provided a number of transverse elements 3 which extend substantially perpendicularly to a conveying direction T and are in the present case designed as shafts 3 interconnecting the two endless conveying elements 1, 2. The endless conveyor comprises a drive mechanism that is not shown. Mounted on each transverse element 3 is at least one hourglass-shaped roller 4. In the present case, six hourglass-shaped rollers 4 are mounted on each transverse element 3, such that the hourglass-shaped rollers 4 mounted on the transverse elements 3 arranged one behind the other, form six rows R1–R6, which rows R1–R6 extend in the conveying direction T. The mutual distance between the successive transverse elements 3 in a first path part A is smaller than in a second path part B1–B4. In the present case, the actual conveying part of the endless conveyor is formed by path part A, a portion B1 of path part B1–B4 and a transition O1. The other portions B2–B4 of the second path part B1–B4 form a return path B2–B4 along which the transverse elements 3 move in order to move again at an inlet side of the endless conveyor. The endless conveyor comprises a first control device 5a which effects an increase of distance between the transverse elements 3 at the location of a first transition O1 from the first A to the second path part B. There is further provided a second control device 5b which effects a decrease of distance between the transverse elements 3 at the location of a second transition O2 from the second B1–B4 to the first path part A. In at least a portion B1 of the second path part B1–B4, which portion B1 extends from the first transition O1, a rotationally-symmetrical support element 6 has been moved between each pair of successive hourglass-shaped rollers 4, for supporting the eggs P to be conveyed. To effect this, a guide 14 is arranged at each row R1–R6, which guide, at the first transition O1, comprises a curve path 20 which provides that the support element 6 gradually swivels upwards.

In particular when the eggs P still have to undergo an inspection for breakage or blood, it is of particular advantage when the eggs are rotated during conveyance. This rotation should take place such that no smearing of foul over the hourglass-shaped rollers 4 is involved. This is effected in that in at least a part C of said portion B1 of the second path part B1–B4, either the hourglass-shaped rollers 4, or the rotationally-symmetrical support elements 6 that have moved between the hourglass-shaped rollers 4 are rotatably drivable, while in the first path part A the hourglass-shaped rollers 4 do not rotate. Consequently, the eggs are rotated only when they rest on an hourglass-shaped roller 4 and a support element 6. Accordingly, rotation of a fouled egg P only causes fouling of one hourglass-shaped roller 4 and the support element 6 and no smearing of foul over the other hourglass-shaped rollers 4. In the present exemplary embodiment, the rotation is effected in that in the path C, a gear rack 16 is provided. Each transverse element 3 comprises a gear 17 which in the path C cooperates with the gear rack 16. Through this cooperation, the relevant transverse element 3 and the hourglass-shaped rollers 4 mounted thereon rotate.

In the present exemplary embodiment, the distance between the hourglass-shaped rollers 4 in the first path A is such that an egg having a diameter greater than 34 mm keeps resting thereon. In the second path B1–B4, the distance between the hourglass-shaped rollers 4 is such that each egg having a diameter smaller than 52 mm falls between the rollers. In this manner, it is ensured that in the first path A, even the smallest chicken egg occurring will not fall between the hourglass-shaped rollers 4, whereas in the second path B1, even the largest chicken egg can still fall between two successive hourglass-shaped rollers when the support element 6 located therebetween has temporarily been swiveled away.

The first control device 5a of the endless conveyor comprises a number of control elements 7 provided with control slots 8, which control slots 8 each have a slot bottom and an opposite, open, free end, and each define a longitudinal center line of the slot. In the present exemplary embodiment, the longitudinal center line of each control slot 8 extends substantially perpendicularly to a direction of travel of the control elements 7 and substantially perpendicularly to the transverse elements 3. However, this is not necessarily the case. At the first transition O1, the control elements 7 travel through a first curve 9, such that each transverse element 3 or part connected thereto that passes into the first transition gradually leaves a slot 8 from the slot bottom of the relevant control slot 8. During this exit movement, the mutual distance between the transverse elements 3 increases. The second control device 5b likewise comprises a number of control elements 7 having control slots 8, which control slots 8 each have a slot bottom and an opposite open, free end, and each define a longitudinal center line of the slot. In the second control device 5b, the longitudinal center line of each control slot likewise extends substantially perpendicularly to a direction of travel of the control elements 7 and substantially perpendicularly to the transverse elements 3. In the second control device, this last is not necessarily the case, either. At the second transition O2, the control elements 7 follow a second curve 10, such that each transverse element 3 or part connected thereto that passes into the second transition O2 gradually enters a slot 8 from the open end of the relevant control slot 8, while during this entering movement, the mutual distance between the transverse elements 3 decreases. When the conveying elements 1, 2 are designed as conveying chains, the decrease of the distance between the transverse elements 3 can be taken up in that the links of the chain hinge relative to each other. However, it is readily understood that the decrease of the distance between the transverse elements 3 can also be taken up in another manner, for instance in that the transverse elements 3 are slidably connected to the endless conveying elements 1, 2. The Figures clearly demonstrate that the first and the second control device 5a and 5b respectively are designed as a single, integral control device 5, with the control elements 7 mounted on a single, endless control-conveying element 11 that travels through both the first and the second curve 9 and 10 respectively. To prevent the transverse elements 3 from being pulled out of alignment, the endless conveyor is provided with two control devices 5, 5' arranged on either side of the conveying face and each following the first and the second curve 9 and 10 respectively. Evidently, instead of two single integrated control devices 5, 5', four separate control devices 5a, 5b, 5a', 5b' are also possible. The control elements 7 can then for instance be mounted on rotatably arranged disks, the circumference of the relevant disks then defining said first and second curves 9 and 10 respectively.

Figure 7:
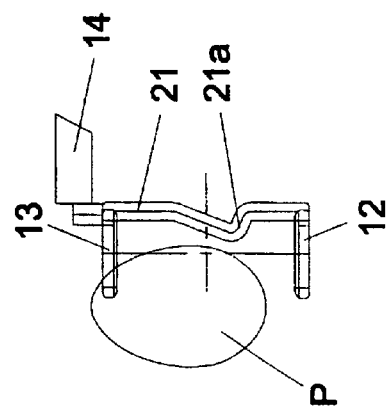
FIG. 7 is a right-hand side elevation of the detail shown in FIG. 6.
Figure 6:
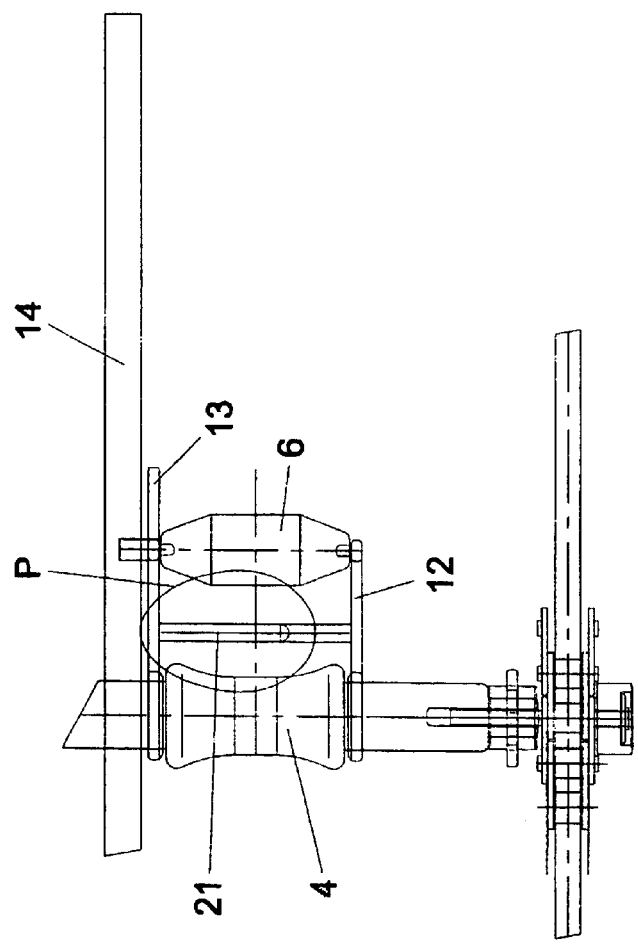
FIG. 6 is a top plan view of a detail from FIG. 1.
Figure 8:
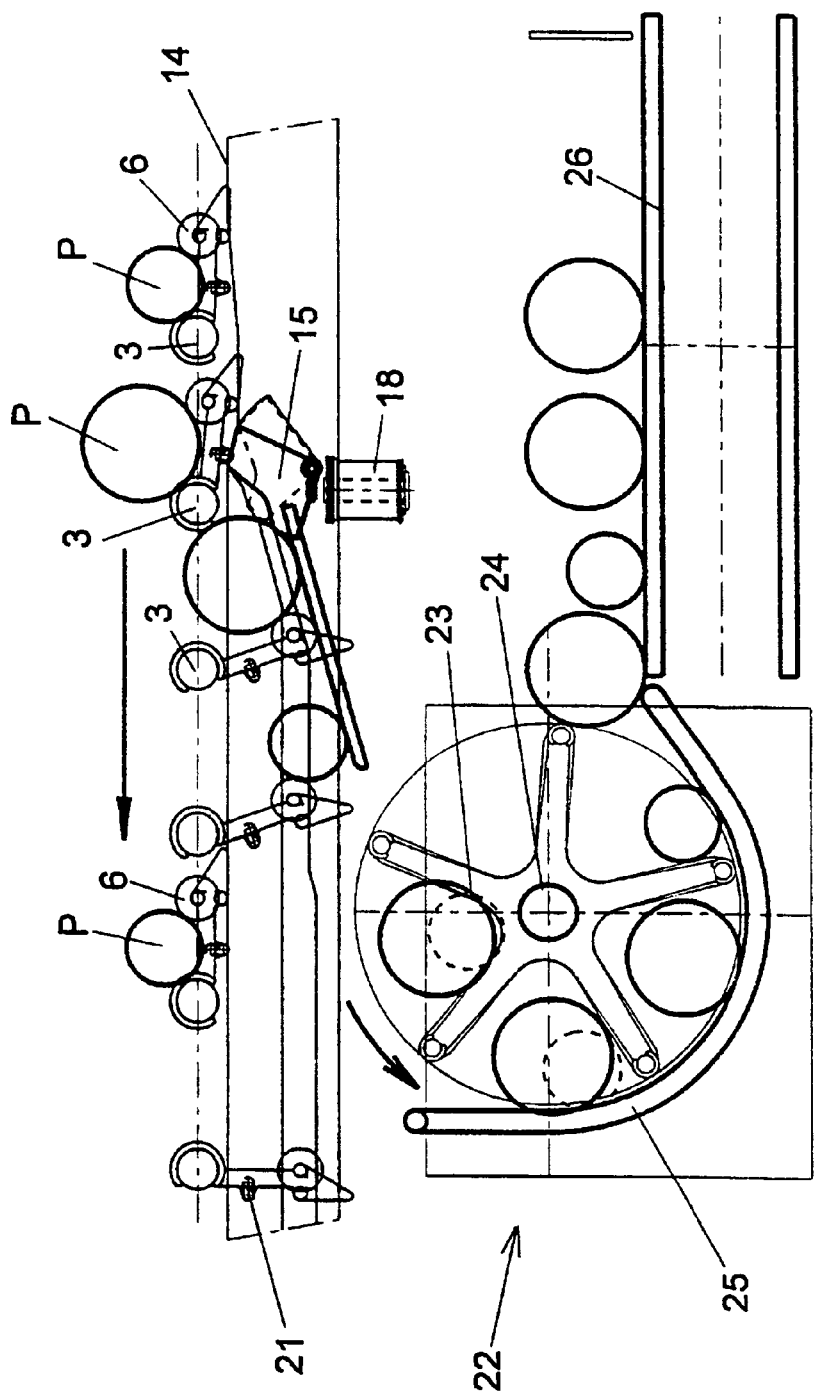
FIG. 8 is a side elevation at the location of the collecting device below the second path part.

In this exemplary embodiment, each rotationally-symmetrical support element 6 is connected to a leading transverse element 3 via at least one swivel arm 12, 13. As is clearly shown in FIGS. 6 and 7, the two swivel arms 12, 13 are further interconnected by a second support element 21. This second support element 21, designed as a rod having a bend 21a, serves to prevent very small eggs from adopting a vertical position between the hourglass-shaped roller and the rotationally-symmetrical support element 6. There are further provided guideways 14 defining the position of the support elements 6 relative to the hourglass-shaped rollers 4. provided in each guideway 14 is a part 15 that is capable of being swiveled aside and whose position is controllable, so that, if so desired, an egg P resting on an hourglass-shaped roller 4 and a rotationally-symmetrical support element 6 can be released or, conversely, fed through. In the present exemplary embodiment, the position of the swivel-aside part 15 in each guideway 14 is controlled by an actuator 18 (see FIGS. 1 and 2) associated with the relevant swivel-aside part 15. Obviously, at the location of the swivel-aside part 15 in the guideway 14, below each row R1–R6 of hourglass-shaped rollers 4, there must be arranged a receiving device by means of which the products removed from the endless conveyor can be further discharged. For this purpose, in the present exemplary embodiment, a simple tray 19 is provided. However, it is also possible that at the location of the swivel-aside part 15 in the guideway 14, below each row R1–R6 of hourglass-shaped rollers 4, a rotatable receiving cage 22 is arranged, for further discharging the released eggs P. FIG. 8 clearly demonstrates the operation of such rotatable receiving cage 22. The cage 22 comprises a kind of blade wheel 23 rotatable about a shaft 24. Around a part of the outer circumference of the blade wheel 23, a guide section 25 extends. Rotation of the blade wheel 23 causes the released eggs to be guided along the guide section 25 and conveyed to the discharging path 26 in a controlled manner. The blade wheel 23 further comprises a number of partitions or strips that provide a subdivision, to form, below each row of hourglass-shaped rollers, a compartment in the receiving cage 22 for receiving released eggs therein.

Figure 3:
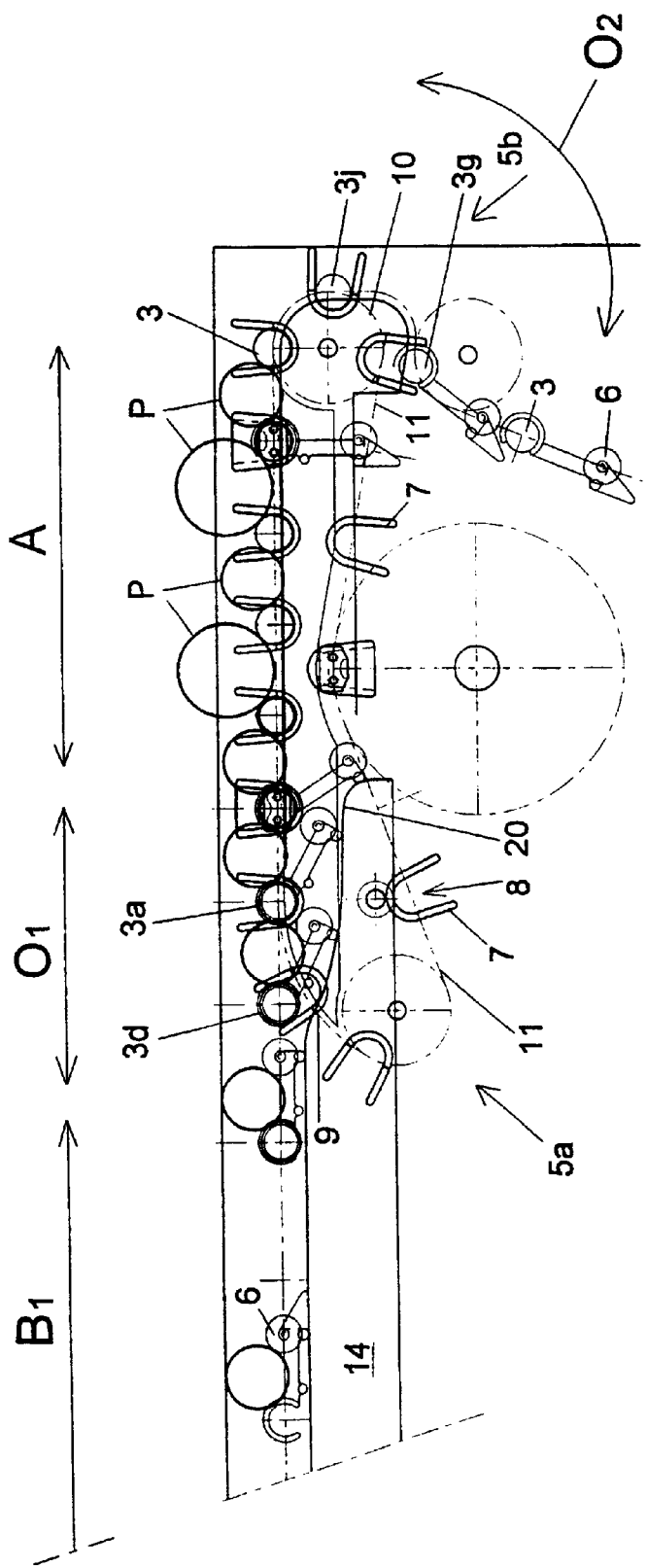
FIG. 3 is a schematic side elevation of the first path part and of the first and the second transition in a first phase.
Figure 4:
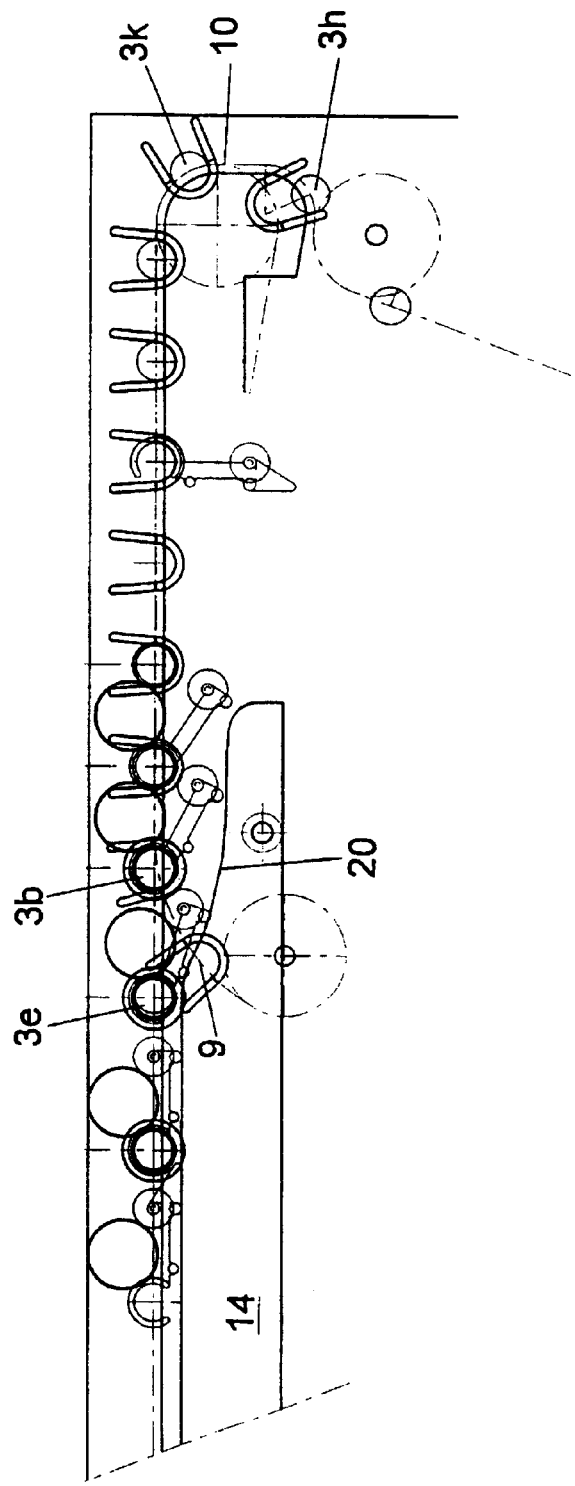
FIGS. 4 and 5 are similar views as given in FIG. 3, in a second and a third phase.
Figure 5:
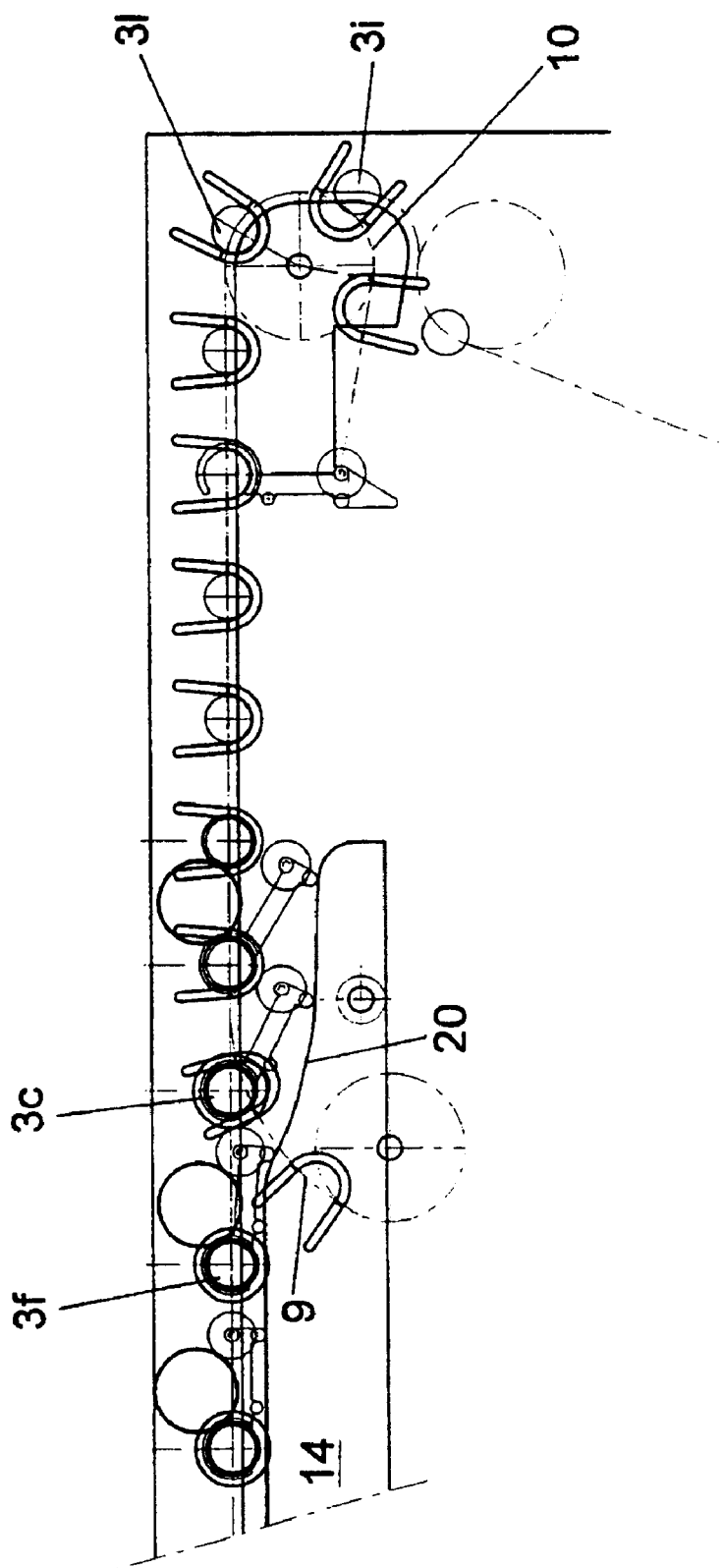

The operation of the endless conveyor is shown, in different conditions, in FIGS. 3–5. It is clearly shown how a transverse element 3 at the first transition O1 gradually moves from the control slot bottom towards the open, free end of the control slot. In FIGS. 3–5, the different positions successively adopted by a transverse element 3 relative to the control slot of a control element 7 traveling through the first curve 9, are designated by 3a, 3b, 3c, 3d, 3e and 3f. It is also clearly visible that the mutual distance between the transverse elements 3 gradually increases. Reference numerals 3g, 3h, 3i, 3j, 3k and 3l denote successive positions of transverse elements 3 relative to a control slot 8 of a control element 7 traveling through the second curve 10. Here, too, it is clearly visible that a relevant transverse element 3 gradually moves from the open, free end of the control slot 8 towards the slot bottom, while at the same time, the mutual distance between the transverse elements 3 becomes smaller.

Figure 9:
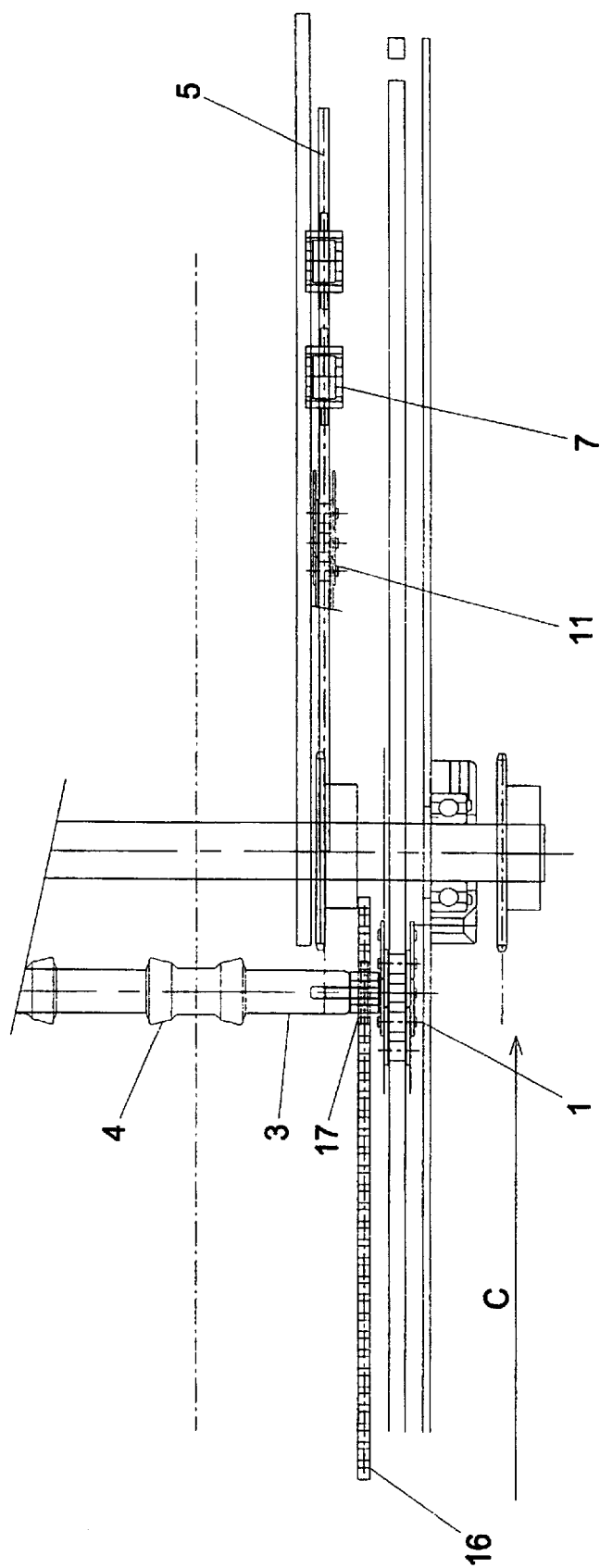
FIG. 9 is a partial and schematic top plan view at the first transition of a second exemplary embodiment of an endless conveyor according to the invention.
Figure 10:
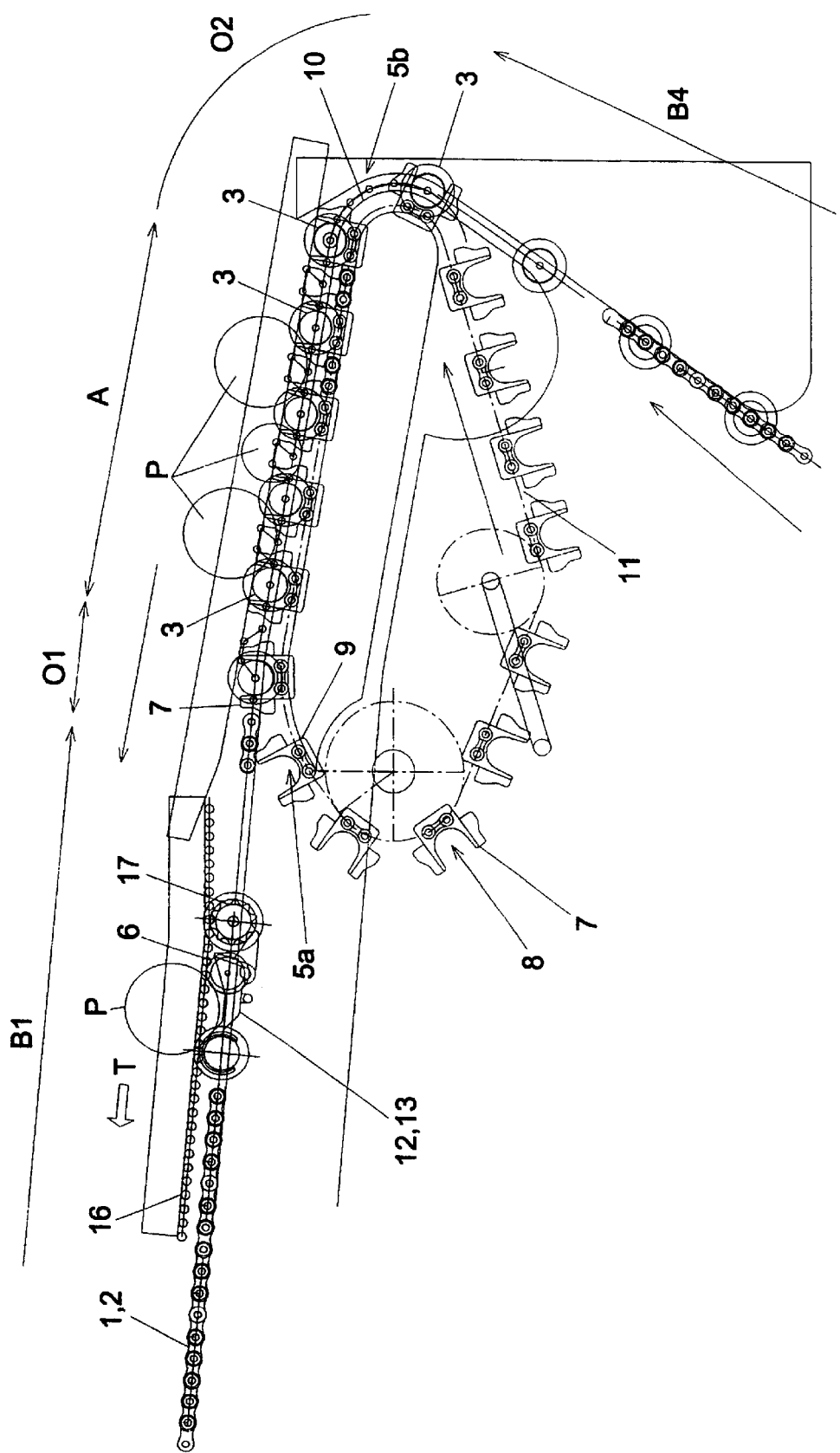
FIG. 10 is a side elevation of the detail shown in top plan view in FIG. 9.
Figure 11:
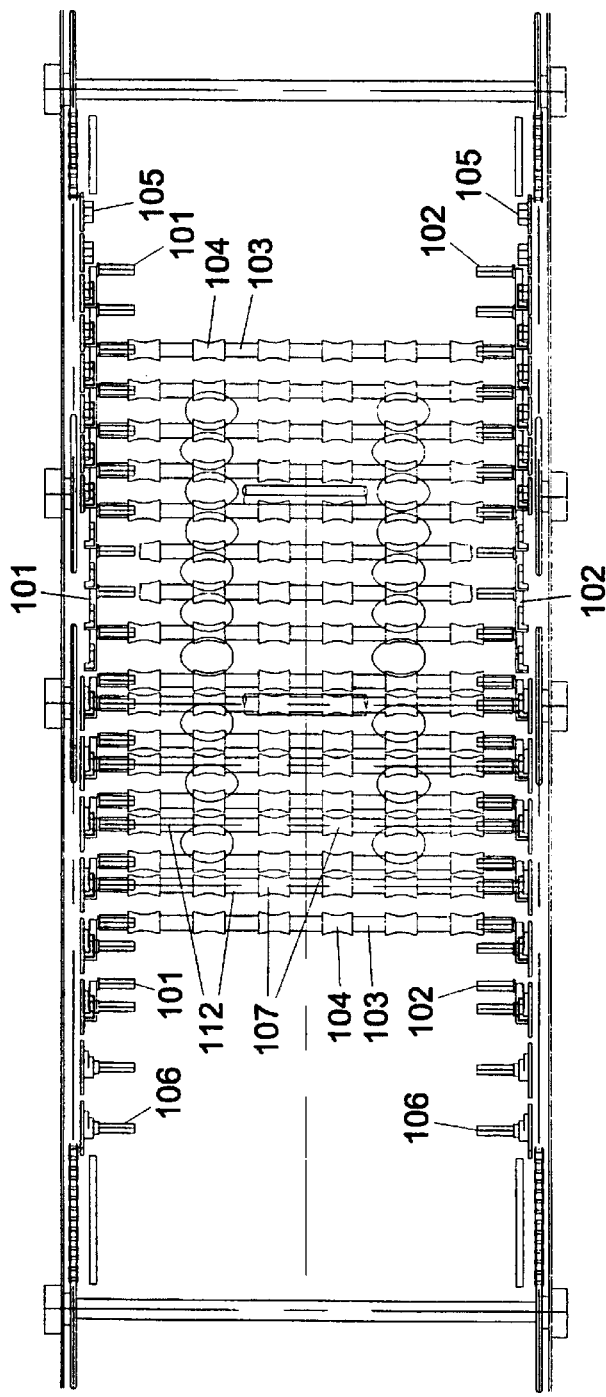
FIG. 11 is a schematic top plan view of a third embodiment of an endless conveyor according to the invention.
Figure 12:
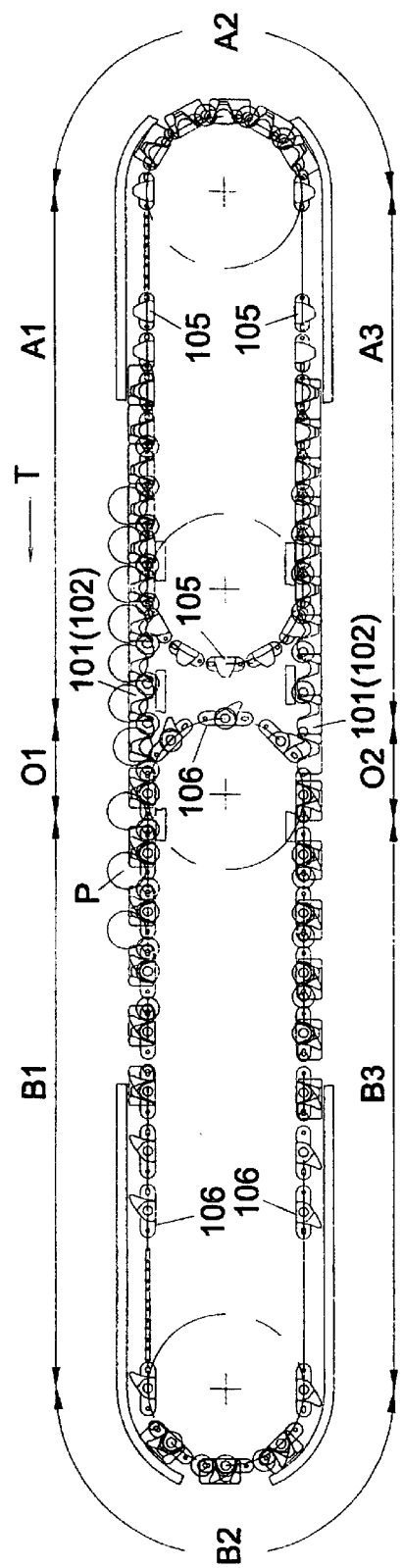
FIG. 12 is a side elevation of the exemplary embodiment represented in FIG. 11.

FIG. 9 shows a partial top plan view of a second exemplary embodiment at the location of the first transition O1 of an endless conveyor according to the invention. FIG. 10 shows in side elevation the same portion as represented in FIG. 9. The reference numerals used in these Figures refer to parts having the same function as parts from FIGS. 1–8 having corresponding reference numerals. The most important difference between the first and the second exemplary embodiment is that the control device 5 is provided with two endless control conveying elements 11 each carrying control elements 7, these control conveying elements 11 being arranged under the conveying face instead of on opposite sides of the conveying face. What is thereby accomplished is that the width of the total system is determined by the width of the conveying face, that is, not additionally augmented by the width of the control devices 5, as these control devices 5 are disposed under the conveying face. The control elements 7 engage the transverse elements 3 instead of extensions of the transverse elements 3 which extend outside the endless conveying elements 1, 2. The exemplary embodiment of FIGS. 9 and 10 therefore provides the advantage that the total width of the endless conveyor in question is considerably limited.

FIGS. 11–17 relate to a third exemplary embodiment of an endless conveyor according to the invention. In this exemplary embodiment, the endless conveying elements 101, 102, which carry the transverse elements 103 with hourglass-shaped rollers 104, are provided with chain links 114 with control slots 108. On opposite sides of the conveying face defined by the endless conveyor, there is located at a first path part A1–A3 a first endless control element 105 which is provided with control cams 109 which are arranged for engagement of the control slots 108. The control cams 109 are disposed on chain links 115 which form part of the control element 105. The cams 109 are spaced apart on the endless control element 105 such that the distance between the hourglass-shaped rollers 4 in the first path part A1–A3 is such that an egg having a diameter greater than 34 mm remains resting thereon. The endless conveyor further comprises two second endless control elements 106 provided with control cams 110, 111, arranged for engagement of the control slots 108. The second control elements 106 extend on either side of the conveying face along the endless conveying elements 101, 102, at the location of the second path part B1–B3 of the endless conveyor. The two endless control elements 106 are interconnected by crossbars 112, on which crossbars 112 support elements 107 are mounted. At the first transition O1, the cams 110 move in the control slots 108 of the endless conveying elements 101, 102. Accordingly, the chain links 114 of the endless conveying elements 101, 102 are moved apart, causing the mutual distance between the hourglass-shaped rollers 104 to increase until said mutual distance is such that an egg having a diameter of 52 mm falls between the hourglass-shaped rollers 104. To prevent this, support elements 107 are mounted on the crossbars 112 that interconnect the control elements 106, which support elements, at the first transition O1, are moved between the transverse elements 103. In this manner, it is effected that the products P are gradually brought from a slight mutual distance to a greater mutual distance without undergoing a sudden change of speed. Moreover, on each hourglass-shaped roller 104 in the second path part B1, only one product rests, so that during rotation of the roller 104, no smearing can occur between products relative to each other.

At the second transition O2, the cam 111 pushes the chain links 114 of the endless conveying elements 101, 102 against one another again, so that they are again at a mutual distance in which the control cams 109 of the first endless control element 105 can readily move in the control slots 108.

Figure 13:
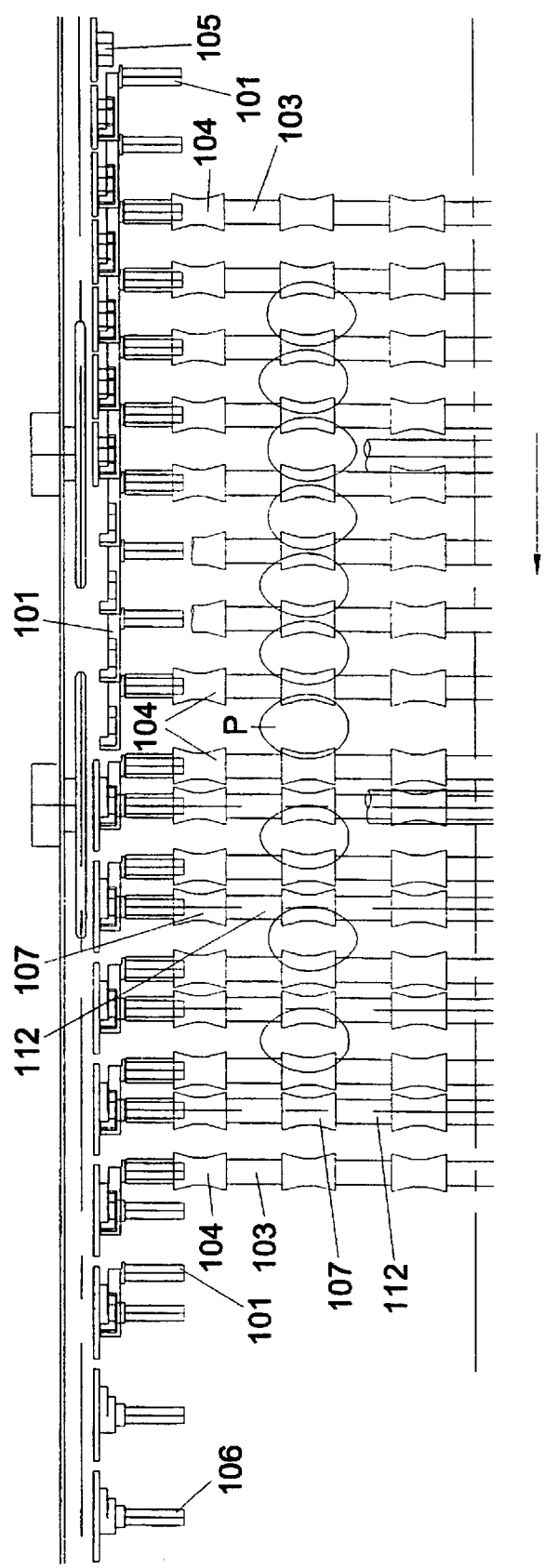
FIG. 13 is a top plan view of the third exemplary embodiment at the first transition.
Figure 14:
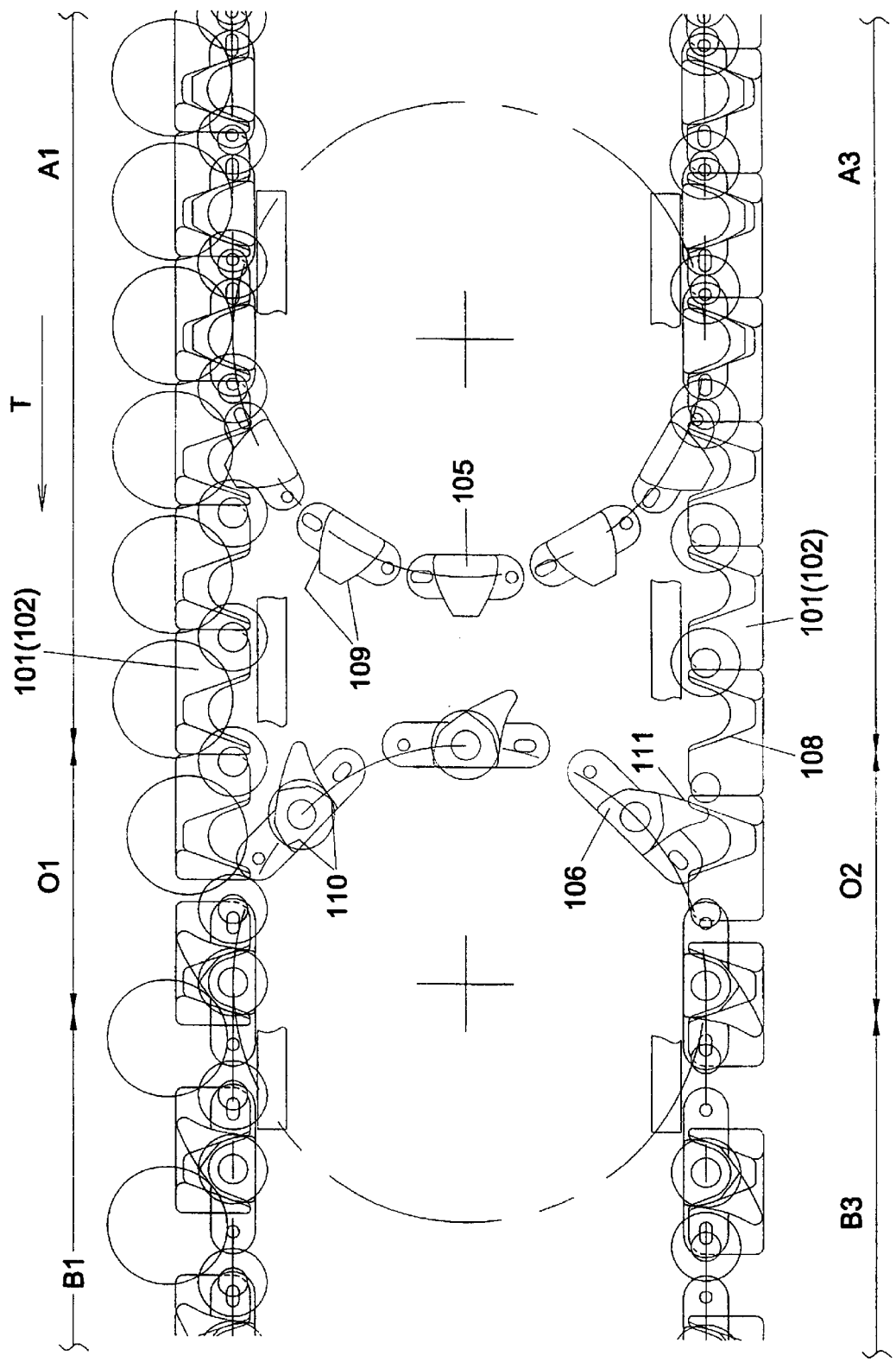
FIG. 14 is a side elevation of the detail represented in FIG. 13.

FIG. 13 is a top plan view of the third exemplary embodiment at the first transition O1, and FIG. 14 shows the same portion in side elevation.

FIG. 15 is a side elevation and a top plan view, respectively, of the chain links 113 of the second control element. Clearly visible are the first cam 110 and the second cam 111, which are both suitable for engagement in the control slot 108 of the chain link 114 of the endless conveying elements 101, 102, which chain link 114 is shown in detail in FIG. 16. The chain link 115 of the first control element 105 is shown in detail in FIG. 17, which likewise represents a top plan view as well as a side elevation, with the cam 109 being clearly visible.

It may be understood that the relative simplicity of the third exemplary embodiment is of particular advantage in view of the manufacturing costs of the relevant endless conveyor.

It is understood that the invention is not limited to the exemplary embodiments described, but hat various modifications are possible within the framework of the invention.

What is claimed is:

1. An endless conveyor for conveying substantially rotationally-symmetrical products, said endless conveyor comprising:

at least one endless conveying element and a number of transverse elements extending substantially perpendicularly to a conveying direction;

a drive mechanism;

at least one hourglass-shaped roller mounted on each transverse element, such that the hourglass-shaped rollers mounted on the transverse elements located one behind the other extend in one or more rows, said rows extending in a conveying direction, a mutual distance between the successive transverse elements in a first path part being smaller than in a second path part;

a first control device for effecting an increase of distance between the transverse elements at a first transition from the first path part to the second path part;

a second control device for effecting a decrease of distance between the transverse elements at a second transition from the second path part to the first path part; and a support element movable between each pair of successive hourglass-shaped rollers for supporting the products to be conveyed.

2. The endless conveyor according to claim 1, wherein either the hourglass-shaped rollers or the support elements disposed between the hourglass-shaped rollers, are rotatable while located in at least a part of said portion of the second path part proximate to said first transition and said hourglass-shaped rollers are not rotateable while located in the first path part.

3. The endless conveyor according to claim 1, wherein the at least one second control device comprises a number of control elements provided with control slots, said control slots each having a slot bottom and an opposite, open, free end and each defining a longitudinal center line of the slot, wherein at the second transition the control elements travel through a second curve such that each transverse element or part connected thereto that passes into the second transition, gradually enters a slot from the open end of the relevant control slot, wherein during this entering movement, the mutual distance between the transverse elements decreases.

4. The endless conveyor according to claim 1, wherein the endless conveying elements are provided with chain links having control slots, and wherein at least one first endless control element is provided with control cams arranged for engagement of the control slots, and the at least one first endless control element extending along the endless conveying elements at the location of the first path.

5. The endless conveyor according to claim 1, wherein the distance between the hourglass-shaped rollers in the first path is so small that the smallest ones of a specific type of product are supportable on two successive hourglass-shaped rollers, and the distance between the hourglass-shaped rollers in the second path is so great that the largest ones of said specific type of product are movable between two successive hourglass-shaped rollers.

6. The endless conveyor according to claim 5, wherein the distance between the successive hourglass-shaped rollers in the first path is such that chicken eggs having a diameter of more than about 34 mm will not fall between the rollers, and wherein the distance between the successive hourglass-shaped rollers in the second path is such that chicken eggs having a diameter of less than about 52 mm can fall between the rollers.

7. The endless conveyor according to claim 1, wherein the at least one first control device comprises a number of control elements provided with control slots, said control slots each having a slot bottom and an opposite, open, free end and each defining a longitudinal center line of the slot, wherein at the first transition the control elements travel through a first curve such that each transverse element or part connected thereto that passes into the first transition, gradually leaves a slot from the slot bottom of the relevant control slot, wherein during this exit movement, the mutual distance between the transverse elements increases.

8. The endless conveyor according to claim 7, wherein the at least one first and the at least one second control device are designed as at least one single integral control device, wherein the control elements are mounted on a single endless control-conveying element traveling through both the first curve and a second curve respectively.

9. The endless conveyor according to claim 1, wherein each rotationally-symmetrical support element is connected, via at least one swivel arm, to a leading or trailing transverse element, wherein at least one guideway is provided which defines the position of the support elements relative to the hourglass-shaped rollers.

10. The endless conveyor according to claim 9, further comprising a swivel-aside part arranged in at least one guideway and whose position is controllable, such that a product resting on an hourglass-shaped roller and a rotationally-symmetrical support element can be released or fed through.

11. The endless conveyor according to claim 10, wherein below a portion of the second path part, at the level of the swivel-aside part in the guideway, a receiving cage is provided with a rotatable blade wheel and a guide section extending around at least a part of the outer circumference of the blade wheel.

12. The endless conveyor according to claim 1, wherein the endless conveying elements are provided with chain links having control slots, and wherein at least one second endless control element is provided with control cams arranged for engagement of the control slots, the at least one second control element extending along the endless conveying elements at the location of the second path.

13. The endless conveyor according to claim 12, further comprising:

two endless control elements extending adjacent the endless conveying elements, said control elements being interconnected by crossbars, on which crossbars the support elements are mounted.

14. The endless conveyor according to claim 12, wherein the second endless control elements have a first set of chain links, each chain link carrying a first cam for keeping a second set of chain links of the endless conveying elements at a distance, and the first set of chain links of the second endless control elements each also carry a second cam for moving the chain links of the endless conveying elements towards each other in a second transition.

\* \* \* \* \*